(12) United States Patent
Moog

(10) Patent No.: US 7,536,398 B2
(45) Date of Patent: May 19, 2009

(54) ON-LINE ORGANIZATION OF DATA SETS

(75) Inventor: Jon Moog, St. Cloud, MN (US)

(73) Assignee: IS Technologies, LLC, St. Cloud, MN (US)

( * ) Notice: Subject to any disclaimer, the term of this patent is extended or adjusted under 35 U.S.C. 154(b) by 229 days.

(21) Appl. No.: 11/092,242

(22) Filed: Mar. 29, 2005

(65) Prior Publication Data

US 2006/0230054 A1    Oct. 12, 2006

(51) Int. Cl.
*G06F 17/30* (2006.01)
(52) U.S. Cl. .............. 707/101; 707/3; 707/10; 707/104.1
(58) Field of Classification Search ............ 707/3, 707/4, 6, 10, 101, 104.1, 205
See application file for complete search history.

(56) References Cited

U.S. PATENT DOCUMENTS

| | | | | | |
|---|---|---|---|---|---|
| 5,414,834 | A | * | 5/1995 | Alexander et al. | 707/100 |
| 6,006,232 | A | * | 12/1999 | Lyons | 707/101 |
| 6,295,533 | B2 | * | 9/2001 | Cohen | 707/5 |
| 6,668,253 | B1 | * | 12/2003 | Thompson et al. | 707/10 |
| 7,058,783 | B2 | * | 6/2006 | Chandrasekaran et al. | 711/171 |
| 7,139,783 | B2 | * | 11/2006 | Hinshaw et al. | 707/205 |

\* cited by examiner

*Primary Examiner*—Jean M Corrielus
(74) *Attorney, Agent, or Firm*—Oppenheimer Wolff & Donnelly LLP

(57) ABSTRACT

To efficiently retain data online, an instance of a data set may be generated. The instance may have a set of data fields with corresponding data values. The instance also may be searchable in response to a data selection request. Another instance may be generated, which also may have a set of data fields with corresponding data values, and which also may be searchable in response to a data selection request. The two instances may each use its own blueprint to normalize data, to perform searches and to return search results. Both of the instances may be stored online such that they are stored independently but are accessible jointly.

29 Claims, 6 Drawing Sheets

Example Data Correlation

| Name | New Home Owner? | Changed Phone Recently? | Most Recent Address |
|---|---|---|---|
| Aldrich, Alan | Yes | Yes | 123 Irving Ave |
| Bryant, Brenda | No | No | 456 James Ave |
| Colfax, Calvin | No | Yes | 789 Knox Ave |
| Dupont, Deborah | Yes | No | 100 Lyndale Ave |
| Emerson, Ellis | No | No | 205 Mount Curve St |

Figure 6

ON-LINE ORGANIZATION OF DATA SETS

FIELD OF THE INVENTION

This invention relates to data processing, and specifically to the on-line organization of data sets for efficient search and retrieval.

BACKGROUND OF THE INVENTION

A typical means of storing a working data set often involves one monolithic database. Updates may be applied to this data set presenting an updated view of the data with little to no history about the previous state. Any updated data can overwrite the previous value yielding a data set focused solely on current values. This may only be acceptable if the desire is for the most up-to-date information with little regard for history.

If there is a desire to store prior state information and values it is typically done in the same physical location. This may allow other dimensions to the data storage in exchange for significant increases in fields and records. Time or version is often a desired alternate data dimension. As the data collection period grows, the monolithic data store can become problematic for scalability and efficient hosting. Over time, the size of the data set may grow significantly, posing feasibility problems for hardware and software host systems. Even if hardware and software can maintain reliability in the face of ever increasing volumes of data, the performance may deteriorate.

Storing data over time may pose a challenge for clients accessing that data. Over time, the format and contents of a data set can often change. It is possible to apply a normalization to the data that can provide a consistent client view despite source changes. As the source format deviates further from the original format, it may become more difficult and resource intensive to convert new updates. Converting new updates to a previous format is usually destructive and so the value inherent in that difference may be lost. It is a cycle that can continue to deteriorate without a wholesale conversion of client expectations and data formats. Conversion of client expectations and interfaces required for a change in data content or format can be costly or impossible. Coordinating this type of conversion in a high availability environment further complicates the process.

Storing all history of a data set may be extremely expensive as every byte stored has a direct cost associated with it. The associated structures for searching the data can add space and further increase cost. Various methods exist for reducing the resources required for storing a data set. Most data storage optimizations are generic and designed to optimize storage space while sacrificing performance.

What is needed in the art is a method for organizing multiple data sets on-line so that over time new content may be added without effecting system reliability or performance. What is also needed is a way to efficiently normalize each of the data sets individually so that a consistent client view may be provided. What is also needed is a flexible system that can accommodate many different data formats.

BRIEF SUMMARY OF THE INVENTION

To efficiently retain data online, an instance of a data set may be generated. The instance may have a set of data fields with corresponding data values. The instance also may be searchable in response to a data selection request. Another instance can be generated, which also may have a set of data fields with corresponding data values, and which also may be searchable in response to a data selection request. The two instances may each use its own blueprint to normalize data, to perform searches and to return search results. Both of the instances may be stored online such that they are stored independently but are accessible jointly.

One object of the invention is to organize multiple data sets on-line. Another object of the invention is to organize data such that over time new content may be added without effecting system reliability or performance. Yet another object is to efficiently normalize each of the data sets individually so that a consistent client view may be provided. These and other objects may be provided in various embodiments of the present invention.

BRIEF DESCRIPTION OF THE DRAWINGS

FIG. 6 is a diagram depicting how data fields may be generated based on comparing information from the various on-line data sets.

DETAILED DESCRIPTION

In the following detailed description preferred embodiments encompassing the principles of the present invention are discussed. Those skilled in the art will readily recognize various modifications and changes that may be made to the invention without strictly following the exemplary embodiments and applications illustrated and described herein, and without departing from the scope of the invention.

Figure 1:
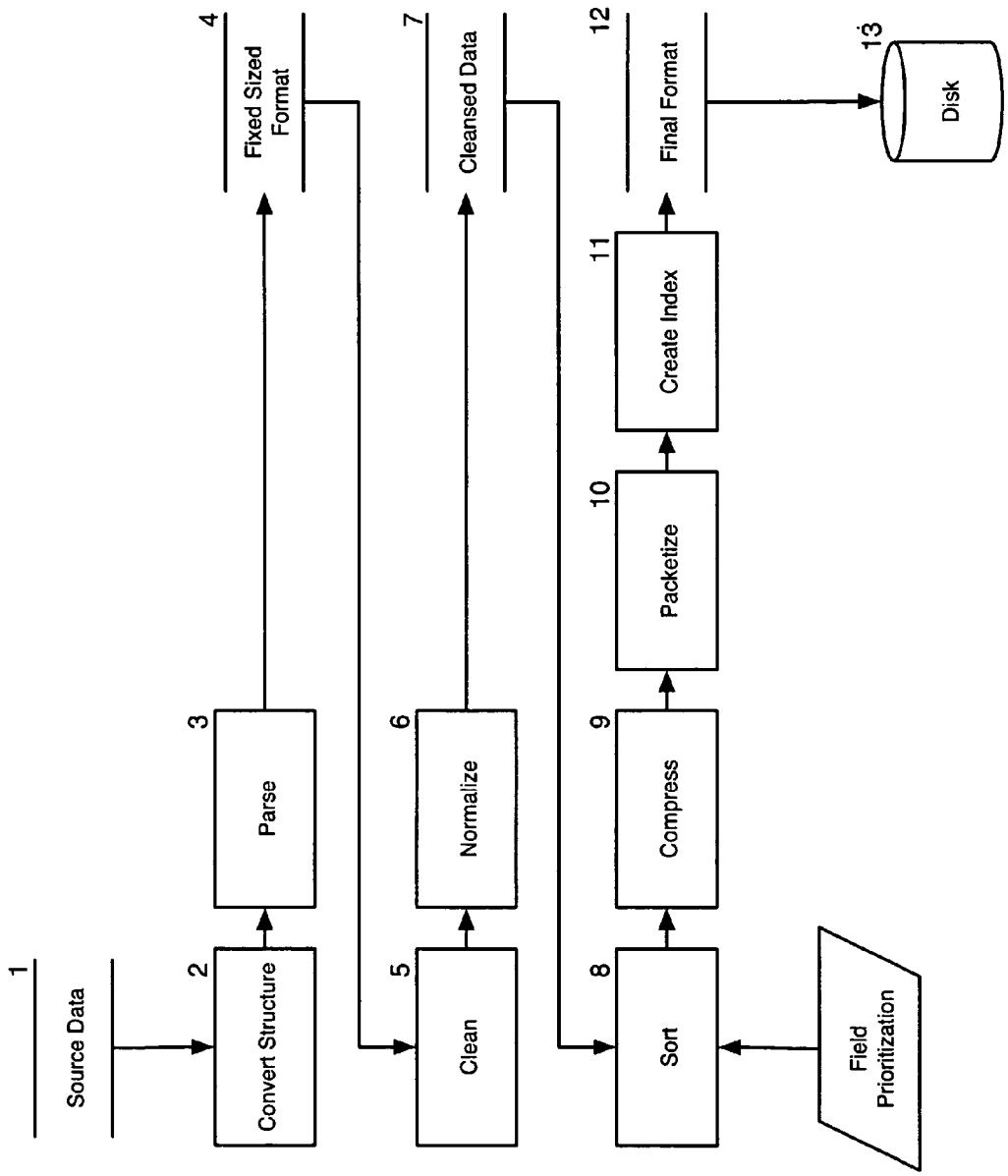
FIG. 1 is a flowchart depicting data preparation.

In a preferred embodiment, a data set is created from raw source data or a derivative of many source data sets, as is shown in Step 1 of FIG. 1. The source and type of information is irrelevant for proper functioning of the invention. The data may be obtained from data suppliers or created internally using various means of aggregating dissimilar data sets. One type of data set that could be used is a list of names, addresses, and phone numbers as would be found in a phone book.

The data set is to be processed to insure data cleanliness and a degree of standardization. Specifically, a data conversion Step 2 is used, followed by parsing Step 3 to achieve the desired results. For data that has a standard format, the content is processed to attempt to provide that standard format. For data that has no standard format, the contents can be processed to remove any extraneous data that might decrease value.

The data set is usually stored in a file on disk, segmented by record with each record sub-segmented by field, as is shown in the fixed size format data produced in Step 4. The data set may be stored in memory or on some other medium to enhance performance and accessibility. Each field and record may be a fixed byte size to facilitate data modification and random access.

The data set is converted to a format more suitable for client access. Steps may be taken to remove invalid data from the data set as is shown in Step 5 and other rules relevant to the specific data content may be applied. Data is converted to a format that is most useful to client processes. Some content may be omitted and some content may be aggregated as is shown in the cleansed data produced in Step 7. Data set fields for strongly typed data are normalized as is shown in Step 6 to present a consistent view to client processes.

During the build process, in a preferred embodiment, the data is ordered as is shown in Step 8 based on a prioritization of fields within the data set. The contents of the data set are ordered and clustered by the data fields contained in the data set based on a specific prioritization of each field. Field prioritization may be specified by field number or field name.

The ordered data is then compressed as is shown in Step 9 and packetized as is shown in Step 10 in data blocks of predetermined size and stored sequentially. The result may be a series of fixed size blocks of compressed data that when accessed sequentially are an ordered version of the data set. This layer may be called the "leaf layer" 21.

Figure 2:
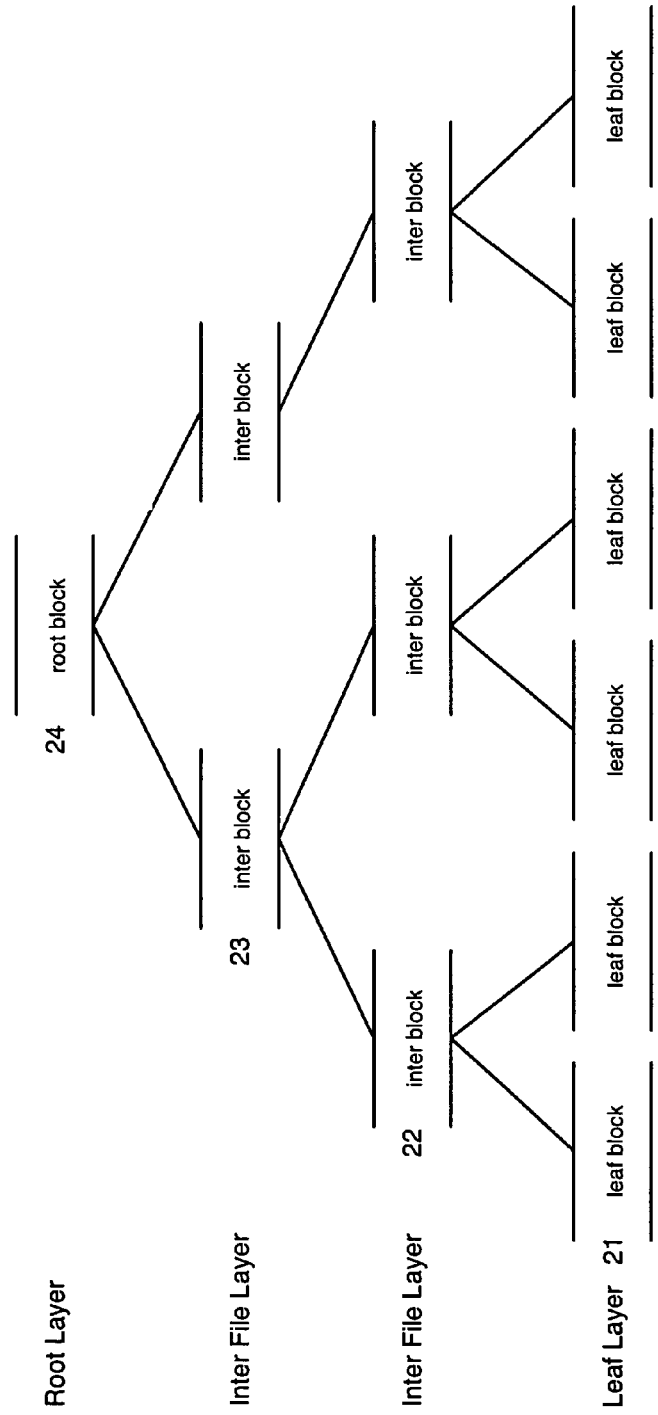
FIG. 2 is a diagram depicting a typical data storage format.

To optimize the access to any random point within the series of data blocks an index is created as is shown in Step 11 from the compressed data blocks. The first element of each leaf layer data block is extracted with the source leaf layer block ID number. The elements are stored in a new data block of predetermined size and stored sequentially. New data blocks are created when the previous data block is fully populated. This process continues until the first value from every block in the leaf layer is processed. This series of blocks may be called an "inter file layer" 22 as is shown in FIG. 2.

The previous inter file layer 23 is processed in the same fashion as the leaf layer. The first element of each inter file layer data block is extracted with the source inter file layer block ID number. The elements are stored in a new data block of predetermined size and stored sequentially. New data blocks are created when the previous data block is fully populated. When the inter file layer is processed completely, the resulting series of blocks are processed in the same fashion. This recursive processing continues until all of the first elements of the preceding layer fit within on data block. This data block may be called the "root block" 24.

All layers that are created, the root data block, the various inter file layers and the leaf layer are combined into one searchable file structure. See FIG. 2. Searching the file can be performed by reading root block node and comparing the search criteria to each of the data elements. The element that best matches the search criteria is considered to be the appropriate pointer to the next file layer. The node whose ID is stored in the element that best matches the search criteria is accessed and the comparison process is repeated. Once the leaf layer is reached, the most relevant data (as determined by the original sort criteria) will be present in the leaf layer data block.

Additional data can be retrieved by reading adjacent data blocks in the leaf layer. Generally, the greater the distance from the initial search point the less similar or relevant the resulting data will be.

The structure of the file can allow arbitrary content or meta-data to be added to the data set contents. Detailed description information may be included with each data set built.

Figure 3:
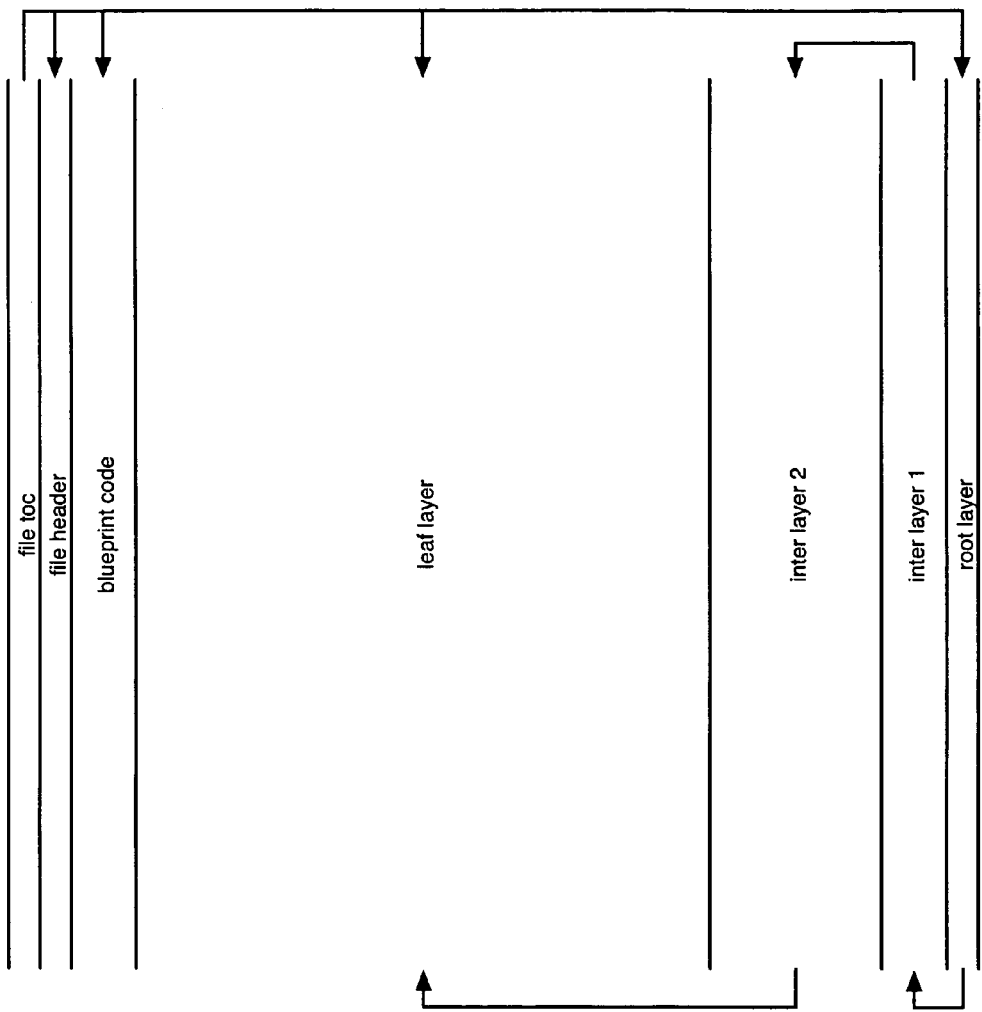
FIG. 3 is a diagram depicting a typical data file format.

In the preferred embodiment, searching is performed by logic that is included in the file in the form of an embedded language code. This code may be called a "blueprint." See FIG. 3. The blueprint's logic allows the data set content to be different from that requested in the search without failing or returning corrupt or irrelevant results. Input data is mapped dynamically for each search request to the actual content of the data set. If no appropriate conversion can be made, an empty set is returned from the request.

The embedded language code may be any well known language or a custom creation designed for a specific type of data set. In the preferred embodiment the embedded code is the same language as that used to create the file. Using one common language for file creation and embedded access simplified the invention and improves reliability. The two do not have to be the same.

After a request is serviced, the resulting data is further processed to provide a uniform and consistent data representation. This processing can return data formatted in different ways dependent on the client request and understanding of that client capability. Additional fields can be constructed by combining record data in arbitrary ways.

The logic that is stored in the data set is typically included during the build phase of that data set. Often the same logic can be propagated to subsequent data sets and may only need to be modified infrequently. Changes to the data input or return format may necessitate changes to the included code to provide a consistent view for clients. Changes can be made to the logic after the file is built without having to rebuild the entire file. The logic can be changed in place without any additional modifications to the file if the size increase is modest. Significant increases in code size require the relocation of the logic within the file and an update to the file toc. See FIG. 3.

As the original data is updated or changed the build process is repeated. Each iteration of the data set may be stored and available for access. The relevant data set can be identified by source description, selective search criteria, version, temporal reference and other criteria.

Figure 4:
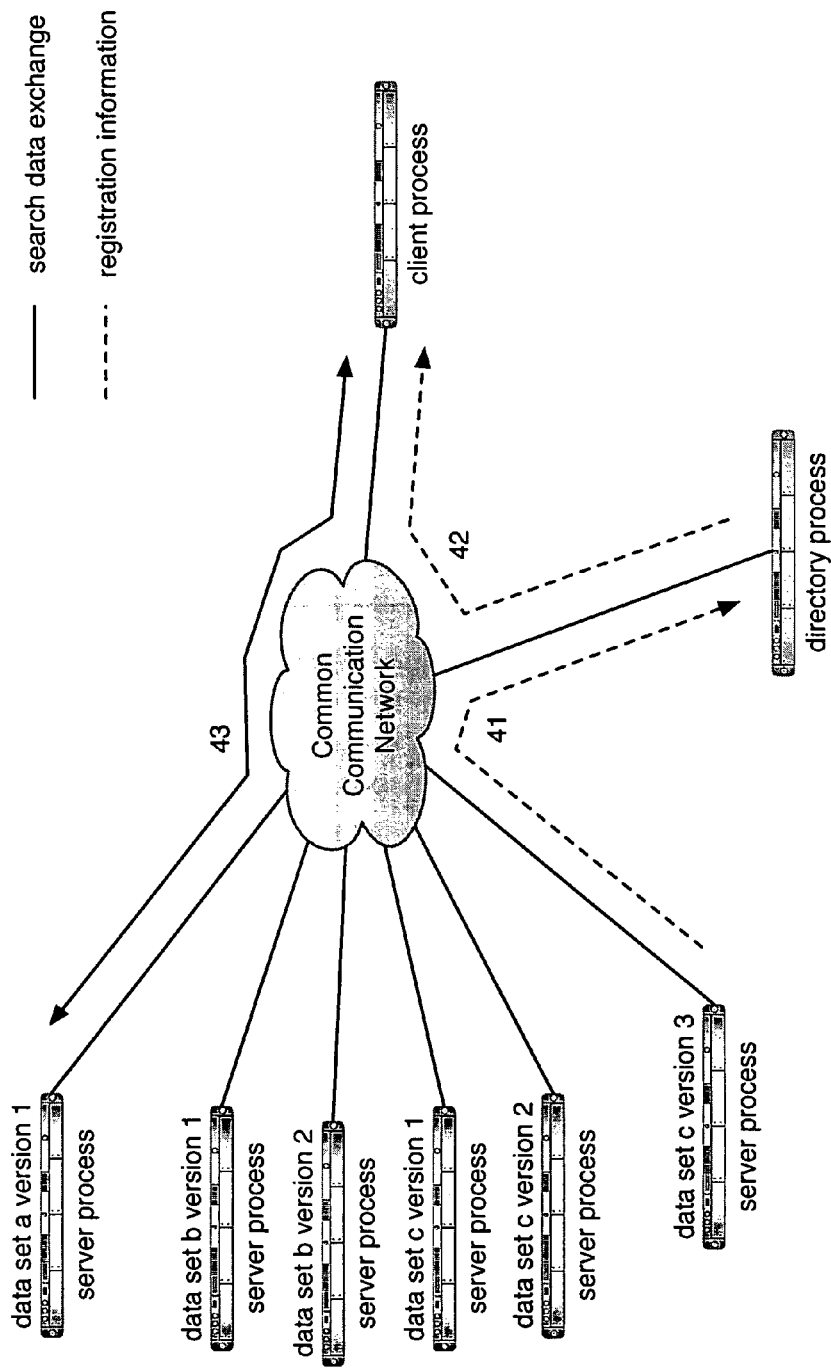
FIG. 4 is a diagram depicting a distributed system network topology.

In one embodiment, individual data sets are hosted on a plurality of small computer systems connected through a common communication network and are made available through a server process that provides remote access to the contents of the data file using the embedded language code. See FIG. 4. Each server process may serve one or more data set files.

The server process uses description information contained in the embedded code to register the service 41 with a directory process running on a separate computer connected to the same communications network.

The directory process stores the content details of the data set in addition to connectivity information. In a preferred embodiment the data registered is flexible and extensible. More specific data set details registered allow clients to more accurately target relevant data sets for queries.

Content details registered by servers may include source description, selective search criteria, version and temporal reference. Additional detail can be registered with the standard items to increase functionality and provide more fine-grained access for clients trying to identify a more specific data set on a server or servers. An example might include the addition of a data indicator for access cost that servers would register allowing clients to further target data sources by expense. Data sets could be identified that match the new indicator as needed, narrowing the scope of the data query.

Client processes connected to the same communications network can request a particular service or data type from the directory process 42 and receive a list of matching services, servers and pertinent connectivity information. This connectivity information provides the client process with the means to initiate communications with appropriate server process or processes on the communication network. In a preferred embodiment the client may choose to expand the scope of its access to encompass more than a specific data set. The client may choose to implement more or less filtering to the list of items provided by the directory process.

When a client is connected to the appropriate server process or processes through the communication network, a request 43 can be made for the search and retrieval of data contained in the associated data set.

The data sent from a client is processed at the server to normalize the search request elements. In an optimal implementation the client sends a search request including some data element or elements that exists in the targeted data set. The embedded code is used to process the request elements to ensure the search can be performed successfully and may return an error code to the client if there is insufficient search data or it is impossible to normalize. In a preferred embodiment for some data sets it may be possible for the server logic to extrapolate valid request elements from client data allowing the search to be performed without generating an error.

The embedded code is responsible for processing a search request from a client and preparing the input for the data set search. A search key that matches the ordering and clustering criteria of the data set being searched is generated by the embedded code and used to locate any relevant records in the file. Based on client requirements and specifications a finite number of matching result records are read from the data set and sent from the server to the client.

In a preferred embodiment after a search is performed the results may be further processed by the embedded code to provide a consistent and appropriate result to the client. Over time the disk-based data format may change necessitating conversion of return results to match previous expectations. The embedded code can be modified in synchronization to the data set changes to provide a consistent client view of the data. It is also possible for the embedded code to vary the output format based on the client capabilities without maintaining multiple copies of a data set in various formats.

As an example of how the present invention may be built and operated, in one embodiment, the invention may be used in connection with processing and hosting scanned phone book white page data, which is updated monthly. In such an embodiment, a data vendor would provide a new version of a scanned white page database containing name, address and phone number information. Each month, upon receipt of the latest version of the data, the file would be processed to convert, clean and normalize the data. The cleansed data would then be ordered appropriately for searching and written out in a searchable compressed format. See FIG. 1. Each file would have a similar structure consisting of a root layer, some number of inter layers, a leaf layer, blue print code, and file header and table of contents. See FIGS. 2 and 3. This process can be repeated with a plurality of data vendors and data sets.

In such an embodiment of the invention, each resulting version of the white page data would be hosted on one of a plurality of computer servers connected to a common communication network. Each server process would register the data set content it provides with a central directory service computer server on the same communication network. Each data set hosted would be identified by data type, search type, version and date. A client process on a computer server connected to the same communication network would query the directory process for servers providing data matching desired criteria. The client process would then connect to the appropriate server processes and submit search requests. The client may query any or all of the services on the communication network. Other data sets can be hosted and accessed in the same manner. See FIG. 4. Scalability and reliability can be improved by hosting individual data sets on a plurality of computer servers. Additional clients can be added to the communication network to maximize utilization of server resources.

A simplified example of how to make and use the present invention will now be described to further explain the invention. Suppose a data management company processes and hosts scanned phone book white page data, which can be used to provide a client with current and former phone numbers and addresses for a set of consumers. In one scenario, each month a data vendor provides a new version of a scanned white page database, where the database contains such consumer data as names, addresses and phone numbers. Each month when the data management company receives the latest version of the data, the data file is processed to convert, clean and normalize the data. The cleansed data is then be ordered appropriately to allow searching and the cleansed data is written out in a searchable compressed format. See FIG. 1. Each of the monthly files has a similar structure consisting of a root layer, some number of inter layers, a leaf layer, blue print code, and file header and table of contents. See FIGS. 2 and 3. This process can be repeated each month for the white page data and may also be repeated for data received from other data vendors. For example, a second data vendor may provide property tax information and a third vendor may provide credit report data. See FIG. 5.

Each resulting version of the white page data can be hosted on one of a plurality of computer servers connected to a common communication network. See FIG. 5. Each server process registers the data set content it provides with a central directory service computer server on the communication network. The directory service can identify each data set hosted by data type, search type, version, date, etc.

A client process on a computer server connected to the same communication network can query the directory process for servers providing data matching desired criteria. The client process can then connect to the appropriate server processes and submit search requests. The client may query any or all of the services on the communication network.

Figure 5:
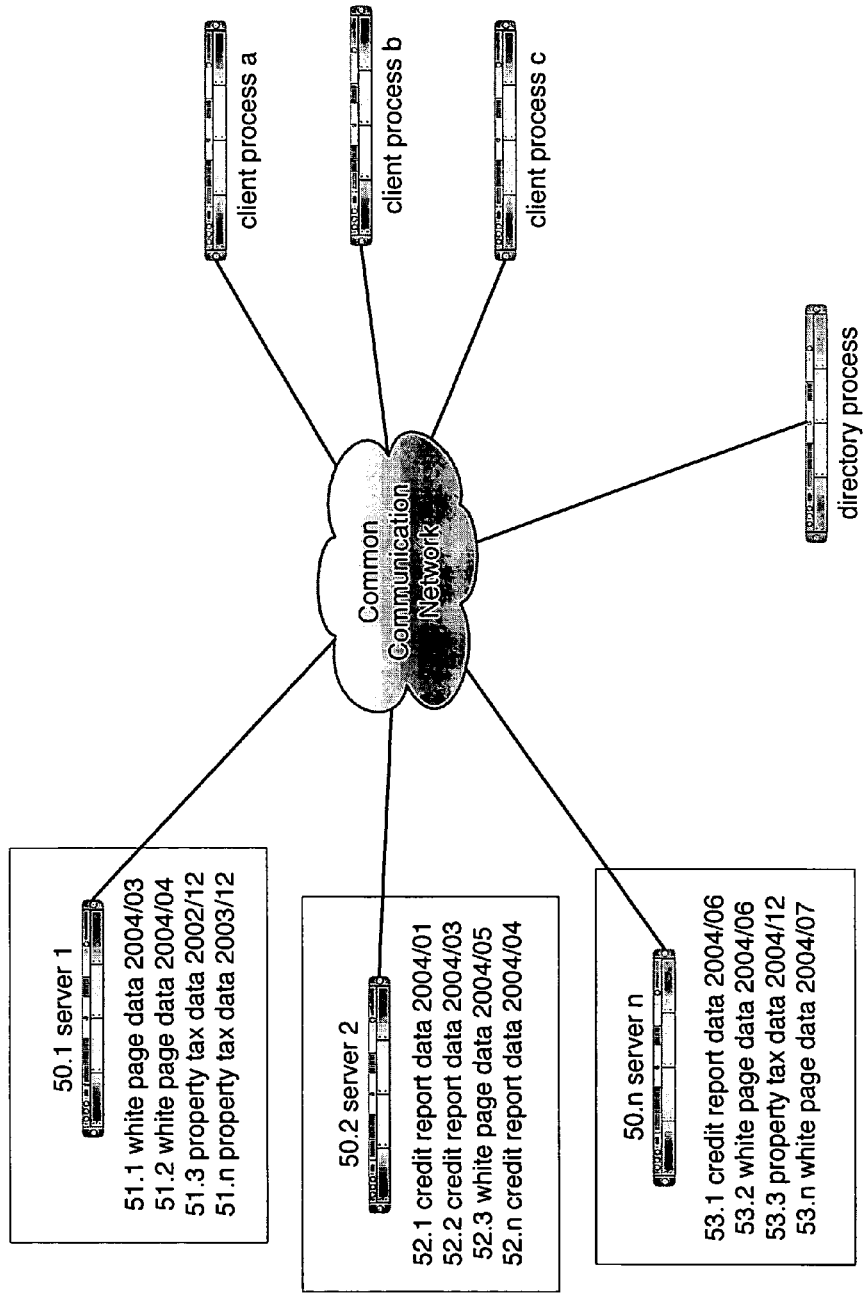
FIG. 5 is a diagram illustrating how data sets from various points in time and from different data vendors can be stored on-line.

For example, suppose again that a data management company has stored the data sets shown in FIG. 5 among a series of servers. A client of the data management company may request a data file for a set of consumers, where the requested file includes a field to indicate whether a consumer is a new home owner, another field to indicate whether the consumer has changed phone numbers recently, and yet another field to indicate the consumer's last probable address.

To determine whether a consumer is a new home owner, the data management company may extract property tax information from the December 2003 data file and compare it against the property tax information from the December 2004 data file. Consumers who appear on the December 2004 data but not the December 2003 data. See FIG. 6, consumers Aldrich and Dupont. The data management company may extract consumer data from the white page data files covering each of the past six months to determine which consumers have changed phone numbers in that period of time. See FIG. 6, consumers Aldrich and Colfax. Then the data management company may leverage data from white page data sets, property tax data sets and credit report data sets to determine the current address for the consumer.

Other data sets can be hosted and accessed in a similar manner. See FIG. 4. As one skilled in the art will appreciate, the on-line availability of data sets for different points in time and from different data vendors can be used in various ways to calculate and report meaningful information about the data. Scalability and reliability can be improved by hosting individual data sets on a plurality of computer servers. Additional clients can be added to the communication network to maximize utilization of server resources.

I claim:

1. A method for retaining data online within a distributed database system comprising:

generating a first instance of a data set comprising a plurality of data fields with corresponding data values searchable in response to a data selection request; generating a second instance of the data set comprising a second plurality of data fields with corresponding data values searchable in response to a data selection request;

sorting and clustering contents of the data set by data fields contained in the data set based on a specific prioritization of each data field, wherein the sorted and clustered data is compressed and packetized into data blocks of predetermined size and stored sequentially; and storing the first and second data instances online in a plurality of databases within a distributed database system, wherein each of the plurality of databases contains a structure distinct from a relational database model, wherein the data values, index elements for the data values, and the data fields of each data instance are encapsulated within one file stored on one of the plurality of databases;

wherein the first and second data instances are each stored independently but are accessible jointly through a directory server containing connectivity information and content details for the data instances;

wherein the first and the second data instances utilize a first and a second blueprint respectively, and wherein each blueprint contains embedded code to control behavior and presentation of data within the data instance, wherein each blueprint contains embedded code to normalize data, to process a data selection request, to perform a search based on the data selection request, to format results of the search, and to return the search with the results of the search, and wherein any additional functions defined within the embedded code of the first data instance independent of functions performed within the second data instance.

2. The method from claim 1, wherein the first data instance represents data at a first time and the second data instance represents data at a second time.

3. The method from claim 1, wherein the steps of generating the first and the second data instances both comprise compressing the plurality of data values for enhancing data access and decreasing storage size.

4. The method from claim 1, further comprising the step of registering the first and the second data instances for systematic access.

5. The method from claim 1, wherein the steps of generating the first and the second data instances comprise indexing the first and the second data values respectively for enabling optimized data retrieval from the first and the second data instances.

6. The method from claim 1, wherein the first data fields have at least one difference from the second data fields; and wherein the first blueprint differs from the second blueprint.

7. A distributed database system for retaining data online comprising:

a data storage component for storing a first instance of a data set comprising a plurality of data fields with corresponding data values searchable in response to a data selection request;

a data storage component for storing a second instance of the data set comprising a second plurality of data fields with corresponding data values searchable in response to a data selection request;

wherein contents of the data set are sorted and clustered by data fields contained in the data set based on a specific prioritization of each data field, wherein the sorted and clustered data is compressed and packetized into data blocks of predetermined size and stored sequentially; and wherein the first and second data instances are both stored online in a plurality of databases within the distributed database system, wherein each of the plurality of databases contains a structure distinct from a relational database model, wherein the data values, index elements for the data values, and the data fields of each data instance are encapsulated within one file stored on one of the plurality of databases;

wherein the first and second data instances are each stored independently but are accessible jointly a directory server containing connectivity information and content details for the data instances;

wherein the first and the second data instances utilize a first and a second blueprint respectively, and wherein each blueprint contains embedded code to control behavior and presentation of data within the data instance, wherein each blueprint contains embedded code to normalize data, to process a data selection request, to perform a search based on the data selection request, to format results of the search, and to return the search with the results of the search; and wherein any additional functions defined within the embedded code of the first data instance are independent of functions performed within the second data instance.

8. The system from claim 7, wherein the first data instance represents data at a first time and the second data instance represents data at a second time.

9. The system from claim 7, wherein the plurality of data values for both the first and the second instances are compressed for enhancing data access and deacasing storage size.

10. The system from claim 7, further comprising a registration component for registering the first and the second data instances for systematic access.

11. The system from claim 7, wherein the plurality of data values for both the first and the second instances are indexed for enabling optimized data retrieval from the first and the second data instances.

12. The system from claim 7, wherein the first data fields have at least one difference from the second data fields; and wherein the first blueprint differs from the second blueprint.

13. A computer readable storage medium comprising computer readable instructions to retain data online within a distributed database system, said computer readable instructions being executable by a computer for:

generating a first instance of a data set comprising a plurality of data fields with corresponding data values searchable in response to a data selection request;

generating a second instance of the data set comprising a second plurality of data fields with corresponding data values searchable in response to a data selection request;

sorting and clustering contents of the data set by data fields contained in the data set based on a specific prioritization of each data field, wherein the sorted and clustered data is compressed and packetized into data blocks of predetermined size and stored sequentially; and storing the first and second data instances online in a plurality of databases within a distributed database system, wherein each of the plurality of databases contains a structure distinct from a relational database model, wherein the data values, index elements for the data values, and the data fields of each data instance are encapsulated within one file stored on one of the plurality of databases;

wherein the first and second data instances are each stored independently but are accessible jointly through a directory server containing connectivity information and content details for the data instances;

wherein the first and the second data instances utilize a first and a second blueprint respectively, and wherein each blueprint contains embedded code to control behavior and presentation of data within the data instance, wherein each blueprint contains embedded code to normalize data, to process a data selection request, to perform a search based on the data selection request, to format results of the search, and to return the search with the results of the search, and wherein any additional functions defined within the embedded code of the first data instance are independent of functions performed within the second data instance.

14. The computer readable storage medium of claim 13, wherein the first data instance represents data at a first time and the second data instance represents data at a second time.

15. The computer readable storage medium of claim 13, wherein said generating the first and the second data instances both comprise compressing the plurality of data values for enhancing data access and decreasing storage size.

16. The computer readable storage medium of claim 13, further comprising registering the first and the second data instances for systematic access.

17. The computer readable storage medium of claim 13, wherein said generating the first and the second data instances comprise indexing the first and the second data values respectively for enabling optimized data retrieval from the first and the second data instances.

18. The computer readable storage medium of claim 13, whereto the first data fields have at least one difference from the second data fields; and wherein the first blueprint differs from the second blueprint.

19. A system to retain data online within a distributed database system comprising:

means for generating a first instance of a data set comprising a first plurality of data fields with corresponding data values searchable in response to a data selection request;

means for generating a second instance of the data set comprising a second plurality of data fields with corresponding data values searchable in response to a data selection request;

means for sorting and clustering contents of the data set by data fields contained in the data set based on a specific prioritization of each data field, wherein the sorted and clustered data is compressed and packetized into data blocks of predetermined size and stored sequentially;

means for storing the first and second data instances online in a plurality of databases within a distributed database system, wherein each of the plurality of databases contains a structure distinct from a relational database model, wherein the data values, index elements for the data values, and the data fields of each data instance are encapsulated within one file stored on one of the plurality of databases;

wherein the first and second data instances are each stored independently but are accessible jointly through a directory server containing connectivity information and content details for the data instances;

wherein the first and the second data instances utilize a first and a second blueprint respectively, and wherein each blueprint contains embedded code to control behavior and presentation of data within the data instance, wherein each blueprint contains embedded code to normalize data, to process a data selection request, to perform a search based on the data selection request, to format results of the search, and to return the search with the results of the search; and wherein any additional functions defined within the embedded code of the first data instance are independent of functions performed within the second data instance.

20. The system from claim 19, wherein the first data instance represents data at a first time and the second data instance represents data at a second time.

21. The system from claim 19, wherein the plurality of data values for both the first and the second instances are compressed for enhancing data access and decreasing storage size.

22. The system from claim 19, further comprising means for registering the first and the second data instances for systematic access.

23. The system from claim 19, wherein the plurality of data values for both the first and the second instances are indexed for enabling optimized data retrieval from the first and the second data instances.

24. The system from claim 19, wherein the first data fields have at least one difference from the second data fields; and wherein the first blueprint differs from the second blueprint.

25. The computer readable storage medium of claim 1, wherein the independent actions performed upon each data instance further include controlling access to the plurality of data fields based on client requirements for regulatory compliance.

26. The system from claim 7, wherein the independent actions performed upon each data instance further include controlling access to the pluraliyt of data fields based on client requirements for regulatory compliance.

27. The computer readable storage medium of claim 13, wherein the independent actions performed upon each data instance further include controlling access to the plurality of cata fields based on client requirements for regulatory compliance.

28. A method for retaining data online within a distributed database system comprising:

generating a first instance of a data set comprising a plurality of data fields with corresponding data values searchable in response to a data selection request, wherein the first data instance represents data at a first time, and wherein the first data instance is ordered and indexed and to enable optimized data retrieval;

generating a second instance of the data set comprising a second plurality of data fields with corresponding data values searchable in response to a data selection request, wherein the second data instance represents data at a second time, and wherein the second data instance is ordered and indexed and to enable optimized data retrieval;

sorting and clustering contents of the data set by data fields contained in the data set based on a specific prioritization of each data field, wherein the sorted and clustered data is compressed and packetized into data blocks of predetermined size and stored sequentially;

storing the first and second data instances online;

wherein the first and second data instances are each stored independently but are accessible jointly through a registration in a directory server on a common communication network, wherein the first and second data instances utilize a first and a second blueprint respectively which provides a consistent view and format between data retrieved from the first and second data instances, wherein each blueprint contains embedded code to control behavior and presentation of data within the data instance, wherein each blueprint contains embedded code to normalize data, to process the data selection request, to perform a search based on the data selection request, to format results of the search, and to return the search with the results of the search, and wherein any additional functions defined within the embedded code of the first data instance are independent of functions performed within the second data instance.

29. The method of claim 26 wherein generating the first instance of a data set comprises converting, compressing, and packetizing as necessary to generate the blueprint enabled plurality of data fields, and wherein generating the second instance of the data set comprises converting, compressing, and packetizing as necessary to generate the blueprint enabled plurality of data fields.

* * * * *

UNITED STATES PATENT AND TRADEMARK OFFICE
CERTIFICATE OF CORRECTION

PATENT NO. : 7,536,398 B2 Page 1 of 1
APPLICATION NO. : 11/092242
DATED : May 19, 2009
INVENTOR(S) : Jon Moog It is certified that error appears in the above-identified patent and that said Letters Patent is hereby corrected as shown below:

Column 2, line 47, replace "insure" with --ensure--

Column 6, line 12, remove "be"

Claim 1, column 7, line 37, after "instance" insert --are--

Claim 9, column 8, line 36, replace "deacasing" with --decreasing--

Claim 25, column 10, line 28, replace "computer readable storage medium" with --method--

Claim 26, column 10, line 35, replace "pluraliyt" with --plurality--

Claim 27, column 10, line 40, replace "cata" with --data--

Claim 29, column 12, line 4, replace "26" with --28--

Signed and Sealed this

Twentieth Day of October, 2009

David J. Kappos
*Director of the United States Patent and Trademark Office*